(12) United States Patent
Henttu et al.

(10) Patent No.: US 7,426,244 B2
(45) Date of Patent: Sep. 16, 2008

(54) TELECOMMUNICATIONS SYSTEM AND RECEIVER

(75) Inventors: Pertti Henttu, Varjakka (FI); Harri Saarnisaari, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/648,644

(22) Filed: Jan. 3, 2007

(65) Prior Publication Data

US 2007/0110139 A1     May 17, 2007

Related U.S. Application Data

(63) Continuation of application No. 10/391,193, filed on Mar. 19, 2003, now Pat. No. 7,173,960.

(30) Foreign Application Priority Data

Mar. 20, 2002   (FI)   ................................. 20020534

(51) Int. Cl.
*H04L 27/00*   (2006.01)
*H04B 1/69*   (2006.01)

(52) U.S. Cl. ...................................... 375/316; 375/147

(58) Field of Classification Search ................. 375/130, 375/140, 147, 152, 143, 316, 343, 148; 370/335, 370/342, 441
See application file for complete search history.

(56) References Cited

U.S. PATENT DOCUMENTS

| | | | |
|---|---|---|---|
| 5,271,038 A | 12/1993 | Cai | |
| 5,412,686 A | 5/1995 | Ling | |
| 6,011,430 A | 1/2000 | Kim | |
| 6,246,732 B1 | 6/2001 | Kobayashi et al. | |
| 6,385,261 B1 | 5/2002 | Tsuji et al. | |
| 6,665,526 B2 | 12/2003 | Tsuji et al. | |
| 7,069,190 B2 * | 6/2006 | Shin et al. | 702/189 |
| 7,254,496 B2 * | 8/2007 | Shin et al. | 702/60 |
| 2002/0012411 A1 | 1/2002 | Heinzl et al. | |

(Continued)

FOREIGN PATENT DOCUMENTS

EP   0 930 719 A2   7/1999

(Continued)

OTHER PUBLICATIONS

Wong et al., "Estimating Local Mean Signal Power Level in Rayleigh Fading Environment", IEEE Transaction on Vehicular Technology, vol. 48, No. 3, May 3, 1999, pp. 956-959.*

(Continued)

*Primary Examiner*—Tesfaldet Bocure
(74) *Attorney, Agent, or Firm*—Squire, Sanders & Dempsey L.L.P.

(57) ABSTRACT

The invention relates to a method for estimating power in a CDMA telecommunications system, in which method a sample set is formed from the received signals. The proposed method reiterates the following steps, until a predetermined ending condition is fulfilled: forming an absolute value set from the absolute values of sample set elements, setting a threshold value; calculating a reference value by multiplying the mean of the absolute value set by the threshold value; comparing the element of the absolute value set with the reference value and forming a second sample set by deleting elements exceeding the reference value from the sample set; the ending condition being fulfilled, estimating the power on the basis of the remaining sample set.

14 Claims, 2 Drawing Sheets

U.S. PATENT DOCUMENTS

| | | |
|---|---|---|
| 2002/0015459 A1 | 2/2002 | Happonen et al. |
| 2002/0021682 A1 | 2/2002 | Ariyoshi et al. |
| 2004/0022228 A1 | 2/2004 | Tyra et al. |

FOREIGN PATENT DOCUMENTS

| | | |
|---|---|---|
| EP | 1 180 851 A2 | 2/2002 |
| GB | 2 304 000 A | 3/1997 |

OTHER PUBLICATIONS

"Median Filtering for Power Estimation in Mobile Communication Systems", Tepedelenlioğlu et al, 3$^{rd}$ IEEE Signal Processing Workshop on Signal Processing Advances in Wireless Communication, Mar. 20-23, 2001, pp. 229-231, XP002240034.

* cited by examiner

TELECOMMUNICATIONS SYSTEM AND RECEIVER

REFERENCE TO RELATED APPLICATIONS

This is a Continuation of application Ser. No. 10/391,193, filed Mar. 19, 2003. which issued as U.S. Pat. No. 7,173,960 on Feb. 6, 2007. The disclosure of the prior application is hereby incorporated herein.

BACKGROUND OF THE INVENTION

1. Field of the Invention

The invention relates to CDMA telecommunications systems and methods and receivers employed therein for power estimation.

2. Description of the Related Art

In CDMA (Code Division Multiple Access) telecommunications systems estimation of received power is important, for instance, in power control and handover decisions. Estimation of an average signal power is important in the optimal adjustment of system parameters. The signal power estimation is also important in view of the handover algorithm.

Particularly in environments, where rapid, impulsive interferences, resulting from multipath propagation, for instance, affect the quality of a received signal, it is important to estimate the power accurately. Impulses disturb the methods used for power estimation, and consequently, the power estimation may fail. The power estimation algorithms used in the CDMA telecommunications systems try to filter off fast impulses from the received signal, and ideally they should be simple.

It has become more and more common to use so-called robust, i.e. control-weighted methods for eliminating impulsive interference in the telecommunications systems. The robust methods are not sensitive to big changes in individual observation values, such as impulse-like interference in a received signal. The prior art robust methods utilize so-called order statistics, the basic idea of which is to detect and eliminate observed interference by properties associated with an observation set arranged on the basis of variable values. One prior art robust method is so-called median-type filtering. This kind of prior art median-type filtering, used for power estimation, is described in greater detail, for instance, in the publication by C. Tepedelenlioğlu, N. Sidiropoulos, G.B. Giannakis, "Median Filtering For Power Estimation In Mobile Communication Systems", Third IEEE Signal Processing Workshop on Signal Processing Advances in Wireless Communications, Taoyuan, Taiwan, Mar. 20-23, 2001, pp 229-231.

The prior art solutions have a drawback that advance information on an. interfering signal is required in order that correct interference impulses could be detected. The prior art solutions do not operate well at high impulse interference frequencies, so they are not very efficient computationally. In addition, the prior art solutions are difficult to implement in practice.

SUMMARY OF THE INVENTION

It is an object of the invention to provide a method and a receiver implementing the method such that drawbacks associated with the prior art can be reduced. This is achieved with a method for estimating power in a CDMA telecommunications system, in which method a sample set is formed of the received signals. In the method of the invention, the following steps are reiterated until a predetermined ending condition is fulfilled: forming a set of absolute values from the absolute values of sample set elements; setting a threshold value; calculating a reference value by multiplying the mean of the absolute value set by the threshold value; comparing the element of the absolute value set with the reference value and forming a second sample set by deleting elements exceeding the reference value from the sample set; the ending condition being fulfilled, estimating the power on the basis of the remaining sample set.

The invention also relates to a receiver comprising means for forming a sample set from signals received. With the means, the receiver of the invention is arranged to reiterate the following until a predetermined ending condition is fulfilled: to form a set of absolute values from the absolute values of sample set elements, to set a threshold value; to calculate a reference value by multiplying the mean of the absolute value set by the threshold value; to compare the element of the absolute value set with the reference value; and to form a second sample set by deleting elements exceeding the reference value from the sample set, the receiver is further arranged to estimate the power on the basis of the remaining sample set, when the ending condition is fulfilled.

The preferred embodiments of the invention are disclosed in the dependent claims.

Several advantages are achieved with the method and system of the invention. A solution that is computationally efficient and simple to implement will be achieved. The proposed solution does not require any advance information on interference. The proposed solution also has an advantage that the method works even at very high frequencies of impulse interference.

BRIEF DESCRIPTION OF THE DRAWINGS

In the following the invention will be described in greater detail in connection with preferred embodiments, with reference to the attached drawings, in which.

DETAILED DESCRIPTION OF THE PREFERRED EMBODIMENTS

The preferred embodiments of the invention can be applied to CDMA telecommunications systems, which comprise one or more base stations and a plurality of terminal equipment, which communicate with one or more base stations. One of the most important functions of the equipment in a CDMA-based system is transmission power control. As distance grows, the signal strength attenuates, and a mobile station in the vicinity of a base station overpowers signals of more remote base stations. The optimal operation of the system requires that the mobile stations adjust their transmission power such that the signals arriving at the base station are as equal in power as possible. The base stations must also transmit their data in correct sequences without that they deviate in time.

Figure 1:
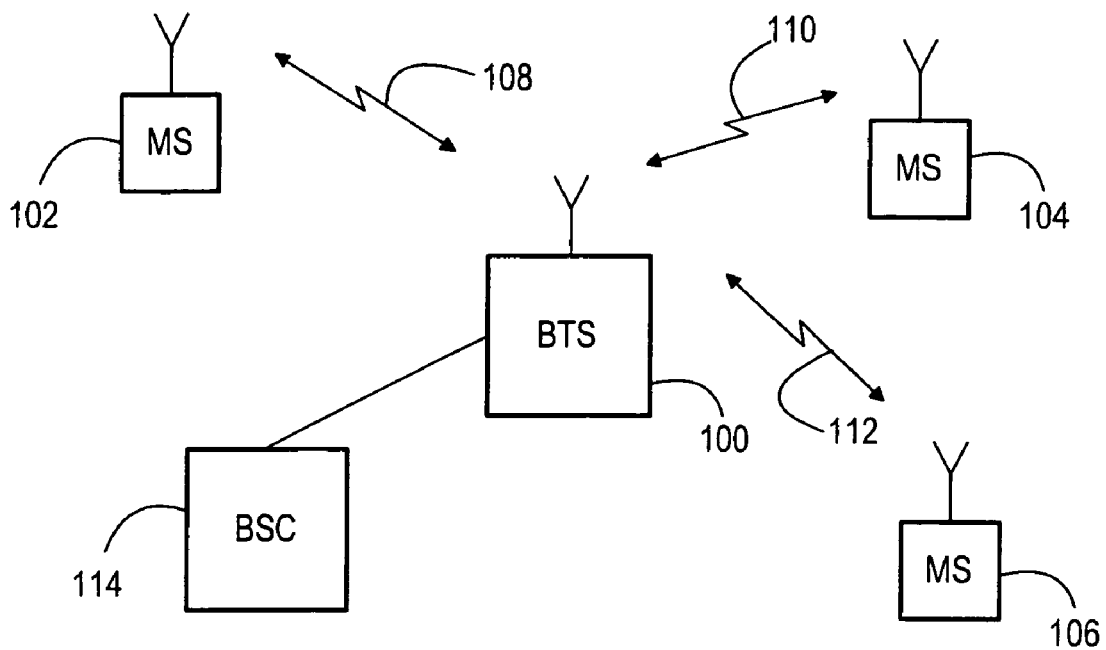
FIG. 1 shows an example of one telecommunications system according to the proposed solution.

The structure of a telecommunications system can be in essence as shown in FIG. 1. The telecommunications system comprises a base station 100 and a plurality of generally mobile subscriber stations 102 to 106, which have bi-directional connections 108 to 112 to the base station 100. The base station 100 switches the connections of the terminal equipment 102 to 106 to a base station controller 114, which forwards them to other parts of the system and to a fixed network. The base station controller 114 controls the operation of one or more base stations. The base station controller 114 monitors the quality of the radio signal and the transmission power, and takes care of the handover of the mobile station. In addition to the electronic components required for transmitting and receiving radio communication, the base station 100 also comprises signal processors, ASIC circuits and general-purpose processors, which take care of data transmission to the base station controller 114 and control the operation of the base station 100. The base station 100 may comprise one or more transmitter/receiver units. The receiver of the proposed solution can be placed in connection with either the base station 100 or the mobile subscriber stations 102 to 106.

Figure 2:
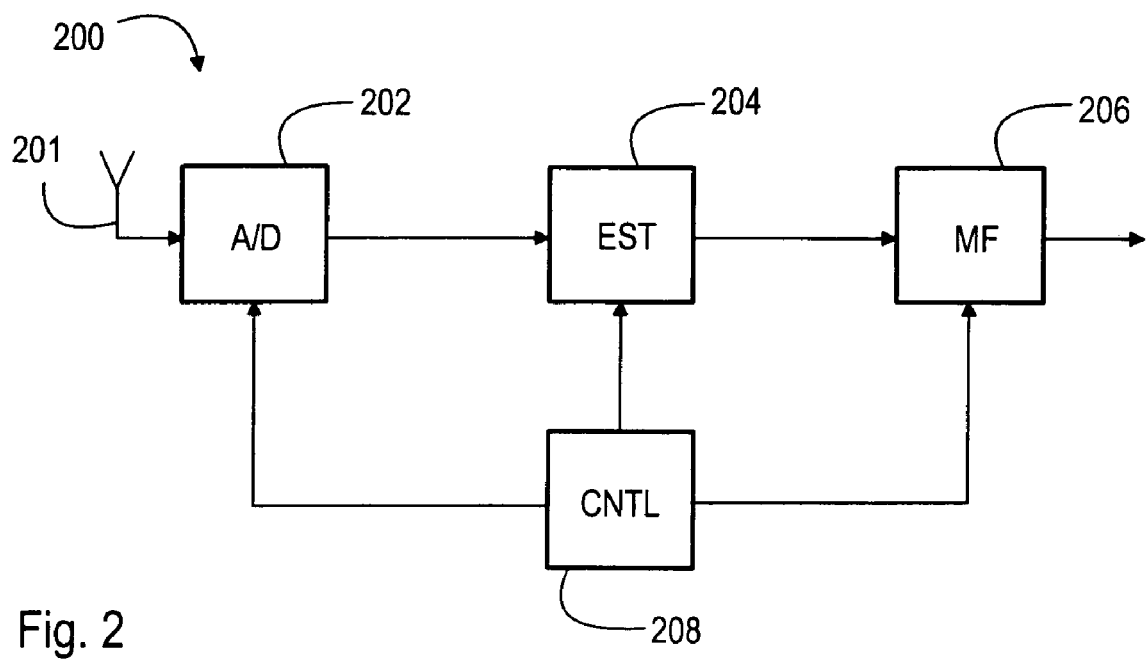
FIG. 2 shows an example of a receiver according to the proposed solution.

FIG. 2 shows an example of a receiver 200 according to the proposed solution. The receiver comprises an A/D converter 202, a power estimation block 204, an adapted filter 206 and a control unit 208. The receiver may also comprise other means implementing receiver operations, such as speech and channel encoders, modulators and RF parts. In addition, the device comprises an antenna 201, by means of which signals are transmitted and received.

All operations of the receiver 200 are controlled by the control unit 208, which is typically implemented by means of a microprocessor and software or separate components. The A/D converter 202 converts the continuous signal received by the receiver 200 into a digital form. The adapted filter 206 is a specific filter adapted to let only the desired signal pass through with slight signal attenuation and to block all other waveforms (including noise). Prior to the adapted filter 206 the signals are at chip level and after the adapted filter at symbol level. The power estimation block 204 is implemented by means of ASIC circuits or a microprocessor and software. In the proposed solution it is possible to place also other components between the power estimation block 204 and the adapted filter 206.

In FIG. 2, sampling, controlled by the control unit 208, in the A/D converter 202 takes place by reading the value of a continuous signal at given intervals. This sampling interval is generally constant in digitizing each signal. After digitizing the signal, the estimation block 204 performs operations controlled by the control unit 208. In the example presented, first, a sample set is formed from the signals received from the A/D converter 202, and from the absolute values of the sample set elements is formed a set of absolute values. In the estimation block 204 there is also determined a reference value, which is the product of the mean of the absolute value set and a predetermined threshold value. Next, in the estimation block 204 there is performed a comparison between the values of elements of the absolute value set and the reference value, whereafter the estimation block 204 deletes such elements from the sample set that exceed said reference value. The estimation block 204 repeats the above-mentioned steps until no elements exceeding the reference value are found in the absolute value set, or until a predetermined number of reiteration rounds have been performed. Thereafter, power estimation is carried out in the estimation block 204 on the basis of the remaining sample set.

Figure 3:
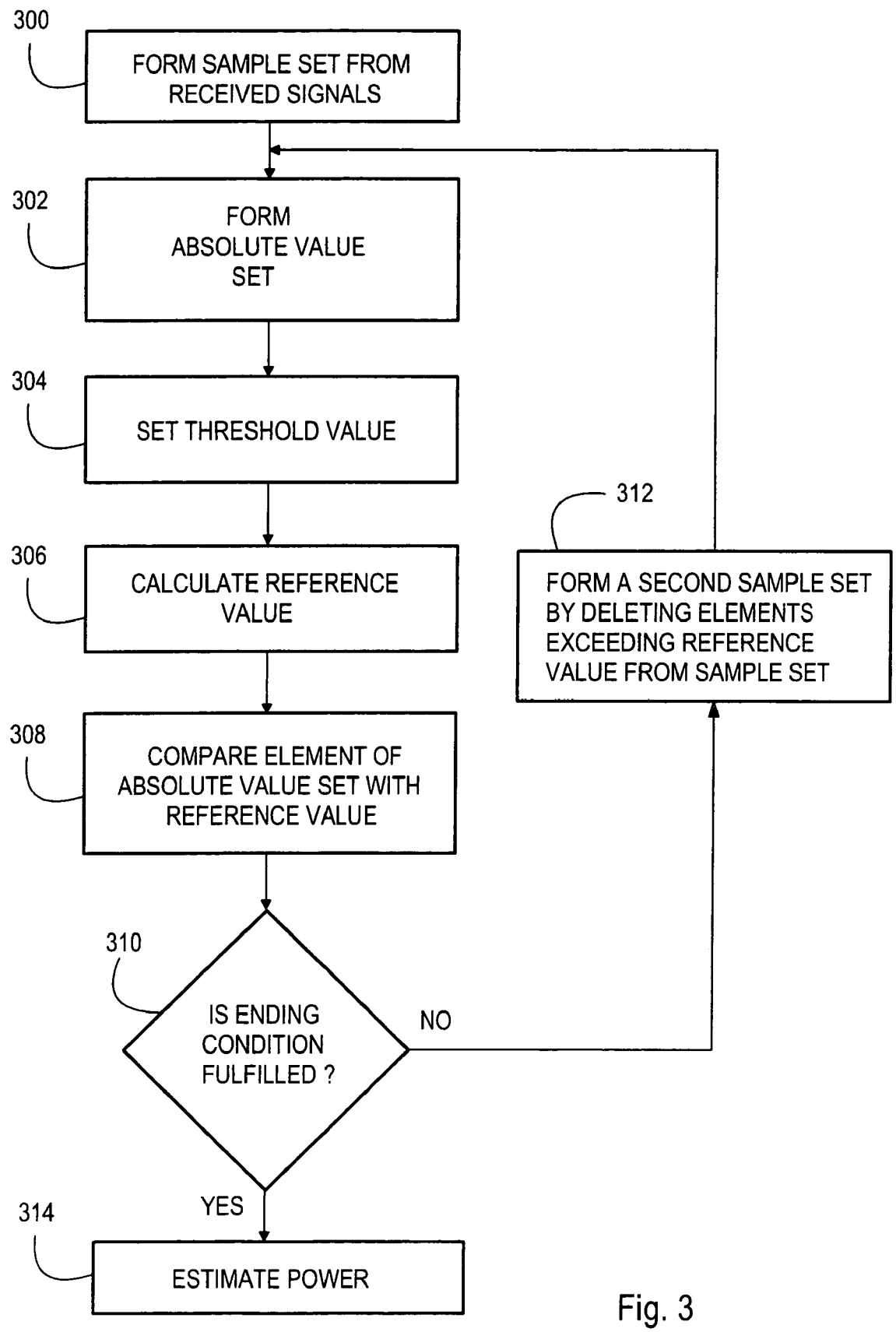
FIG. 3 shows a block diagram of a power estimation method according to the invention.

FIG. 3 shows a block diagram of a power estimation method according to the proposed solution. In step 300, a sample set is formed from the received signals. The received signal comprises thermal noise and interference impulses. The object of the method is to cancel the impulsive interference from the received signal prior to determining the power of the received signal. This is implemented by dividing the received chip-level samples into a desired set and an interfering set, which is done by means of a threshold value. The desired set will thus be the remaining sample set, from which the interferences have been cancelled. The sample set formed in step 300 is assumed to be Gaussian with zero mean, whereby the amplitude of the sample sequence is Rayleigh-distributed. This situation is achieved in multiple user DS-CDMA systems, in which the power control works. Whereas, if there are only few users, or the power control does not work, the mean of the variables deviates from zero, whereby the amplitude is Rice-distributed.

After forming the sample set in step 300, the process proceeds to step 302, in which an absolute value set is formed from the absolute values of the sample set elements. As the desired set of chip-level samples is assumed to be Gaussian with zero mean, the absolute value set consisting of the absolute values of the desired set is Rayleigh-distributed. In practice, the desired set is not precisely Gaussian, but the method is simplified by this assumption. The aim of the so-called robust methods is not to find a real model of an adjustable system per se, but the aim is to achieve sufficiently good functioning of the system as a whole. For instance, if the sample set comprises a DS signal and thermal noise, the absolute values of these samples are Rice-distributed. The proposed method can still be used in that case, too.

In step 304, a threshold value is set that is needed in the subsequent step 306 for computing a reference value. The threshold value required for the reference value is obtained from Rayleigh distribution. For instance, if it is desired that 0.1 per cent of the sample set elements be deleted, the threshold value is advantageously 2.97. Whereas, if it is desired that 1 per cent of the sample set elements be deleted, the threshold value is 2.42. The assumption that the desired set is Gaussian with zero mean is sufficient for determining the threshold value. The threshold value 2.97 is an acceptable value in all desired cases independent of Gaussian set variance. In a case of non-interference this particular threshold value 2.97 causes a situation, in which only 0.1 per cent of the samples of the desired set is erroneously selected to be impulses.

After setting the threshold value in step 304, the process proceeds to step 306, in which a reference value is computed by multiplying the mean of the absolute value set by said predetermined threshold value. Next, in step 308 the element of the absolute value set is compared with the reference value. In step 310 it is checked whether a given ending value is fulfilled. This is carried out, for instance, by searching if there are values among the element values of the absolute value set that exceed the reference value. If values exceeding the reference value are not found, the ending condition is fulfilled and the process proceeds to step 314 to estimate power. Whereas, if it is detected in step 310 that there are values among the absolute value set that exceed the reference value, the ending condition is not fulfilled and step 312 is proceeded to, in which the elements exceeding said reference value are deleted from the sample set. From step 312 the process proceeds back to step 302, in which the absolute value set of the remaining sample set is computed. Thereafter, the process proceeds again stepwise, until in step 310 no element values exceeding the reference value are found, or until steps 302, 304, 306, 308, 310 and 312 have been reiterated a predetermined number of times. Thus, the ending condition can be fulfilled, for instance, when element values exceeding the reference value are no longer found, or, when steps 302, 304, 306, 308, 310 and 312 have been reiterated a predetermined number of times.

Power estimation in step 314 is performed, for instance, by using a so-called classical power estimator, whereby the power estimation is performed on the basis of the mean of squares of the absolute values of the elements of the desired remaining sample set by using formula (1), or on the basis of the mean of squares of the elements of the absolute value set of the desired remaining sample set by using formula (2):

$$P_{clas} = \frac{1}{N}\sum_{i=1}^{N}|y_i|^2 \quad (1)$$

$$P_{clas} = \frac{1}{N}\sum_{i=1}^{N}x_i^2 \quad (2)$$

wherein:

$P_{clas}$ is power,

N is the number of elements, $|y_i|$ is the absolute value of the element of the desired remaining sample set, $X_i$ is an element of the absolute value set of the desired remaining sample set.

Power estimation in step 314 can also be carried out by a method that is based on Rayleigh distribution, whereby the power estimation is performed by means of formula (3):

$$P_{ray} = \frac{4}{\pi}\left(\frac{1}{N}\sum_{i=1}^{N}x_i\right)^2 \quad (3)$$

wherein:

$P_{ray}$ is power and the mean of the elements of the absolute value set shown in brackets has already been computed in step 306.

The built-in property of the proposed method, the ready-computed mean, enables more simplified power determination as compared with conventional methods. The method assumes that the desired set constitutes Gaussian distribution with zero mean. In addition, variance of the desired set need not be known on determining a threshold value. Thus, the desired set can be e.g. a direct sequence signal, which is below zero mean Gaussian noise (thermal noise). This situation arises, for instance, in spread spectrum systems, in which the signal-to-noise ratio at chip level is less than zero desibel. After the adapted filter 206, the signal-to-noise ratio is higher, depending on the length of the spreading code, i.e. detection amplification. The method does not require any advance information on the interference, however.

The proposed solution works well at a very high impulse interference frequency, for instance with a frequency value of 0.5. The proposed solution works the better the lower the impulse interference frequency. An error in power estimation is less than 30 per cent with all impulse powers and an error in all impulse frequencies is less than 0.2. The method works well also in interference-free situations. The proposed method works the better the lower the frequency of the impulse noise, irrespective of the power of the impulse noise. Thus, the method can also cancel low-frequency interference. The method works also even if up to 50 per cent of the samples were interference impulses.

Even though the invention is described above with reference to the example of the attached drawings, it is apparent that the invention is not restricted thereto, but it can be modified in a variety of ways within the inventive idea of the accompanying claims.

The invention claimed is:

1. A method, comprising:
   forming a sample set of received signals;
   reiterating the following until a predetermined ending condition is fulfilled,
      forming an absolute value set from the absolute values of sample set elements,
      setting a threshold value,
      calculating a reference value by multiplying a mean of the absolute value set by the threshold value,
      comparing an element of the absolute value set with the reference value, and
      forming a second sample set by deleting elements exceeding the reference value from the sample set;
   the ending condition being fulfilled, estimating power in a telecommunications system on a basis of the remaining sample set.

2. The method of claim 1, wherein the threshold value is set on a basis of Rayleigh distribution.

3. The method of claim 1, wherein the ending condition is fulfilled, when the steps have been reiterated a predetermined number of times.

4. The method of claim 1, wherein the ending condition is fulfilled, when the absolute value set does not include element values that exceed the reference value.

5. The method of claim 1, wherein the power is estimated on the basis of a mean of squares of the absolute values of the remaining sample set elements.

6. The method of claim 1, wherein the power is estimated by the Rayleigh distribution method.

7. An apparatus comprising:
   a processor configured to form a sample set from signals received;
   an estimator configured to reiterate the following until a predetermined ending condition is fulfilled,
      forming an absolute value set from absolute values of the sample set elements,
      setting a threshold value,
      calculating a reference value by multiplying a mean of the absolute value set by the threshold value,
      comparing an element of the absolute value set with the reference value, and
      forming a second sample set by deleting elements exceeding the reference value from the sample set;
   wherein the estimator is further configured to estimate power in a telecommunications system on a basis of the remaining sample set, when the predetermined ending condition is fulfilled.

8. The apparatus of claim 7, wherein the apparatus is configured to set a threshold value from Rayleigh distribution.

9. The apparatus of claim 7, wherein the predetermined ending condition includes fulfillment of a predetermined number of reiterations.

10. The apparatus of claim 7, wherein the ending condition includes a comparison arranged for the receiver, in which comparison no element values exceeding the reference value are found.

11. The apparatus of claim 7, wherein the estimator is further configured to estimate the power on a basis of the mean of the squares of the absolute values of the remaining sample set elements.

12. The apparatus of claim 7, wherein the estimator is further configured to estimate the power by the Rayleigh distribution method.

13. The apparatus of claim 7, wherein the estimator is further configured to estimate the power in a code division multiple access telecommunications system.

14. An apparatus comprising:
first forming means for forming a first sample set from signals received;
second forming means for forming an absolute value set from absolute values of the sample set elements;
setting means for setting a threshold values;
calculating means for calculating a reference value by multiplying a mean of the absolute value set by the threshold values;
comparing means for comparing an element of the absolute value set with the reference values; and
third forming means for forming a second sample set by deleting elements exceeding the reference value from the sample set,
wherein the second forming means, setting means, calculating means, comparing means, and third forming means repeatedly function until a predetermined ending condition is fulfilled, said receiver further comprising
estimating means for estimating power in a telecommunications system on a basis of the remaining sample set when the predetermined ending condition is fulfilled.

* * * * *